United States Patent
Goto et al.

(10) Patent No.: US 6,847,864 B2
(45) Date of Patent: Jan. 25, 2005

(54) VEHICULAR COMMUNICATIONS SYSTEM INITIALIZING ABNORMAL CONTROL UNIT

(75) Inventors: Yoshinori Goto, Kariya (JP); Hiromitsu Tanioka, Anjo (JP)

(73) Assignee: Denso Corporation, Kariya (JP)

(*) Notice: Subject to any disclaimer, the term of this patent is extended or adjusted under 35 U.S.C. 154(b) by 70 days.

(21) Appl. No.: 10/458,728

(22) Filed: Jun. 11, 2003

(65) Prior Publication Data

US 2004/0029556 A1 Feb. 12, 2004

(30) Foreign Application Priority Data

Jun. 12, 2002 (JP) .................................... 2002-171510

(51) Int. Cl.$^7$ ............................................ G05B 23/00
(52) U.S. Cl. ................................ 701/1; 701/2; 701/29; 455/419; 702/183
(58) Field of Search .................. 701/1, 2, 29, 33, 701/35; 702/183, 187, 188; 455/419, 423; 714/712, 715; 340/438, 286.01, 286.02

(56) References Cited

U.S. PATENT DOCUMENTS

| | | | | |
|---|---|---|---|---|
| 5,594,646 A | * | 1/1997 | Itoh et al. ..................... 701/35 |
| 5,987,365 A | * | 11/1999 | Okamoto ...................... 701/29 |
| 6,075,438 A | * | 6/2000 | Abe et al. ............... 340/286.01 |
| 6,181,994 B1 | | 1/2001 | Colson et al. ................. 701/33 |
| 6,321,148 B1 | * | 11/2001 | Leung .......................... 701/29 |

FOREIGN PATENT DOCUMENTS

| | | |
|---|---|---|
| JP | A-S56-33739 | 4/1981 |
| JP | A-S61-1552 | 1/1986 |
| JP | A-S63-224446 | 9/1988 |
| JP | A-H09-315272 | 12/1997 |
| JP | A-H11-134529 | 5/1999 |

* cited by examiner

*Primary Examiner*—Tan Q. Nguyen
(74) *Attorney, Agent, or Firm*—Posz & Bethards, PLC

(57) ABSTRACT

A vehicular communications system connects, through a communications network, with a plurality of electronic control units (ECUs) that control respective in-vehicle devices. The vehicular communications system further connects with a master ECU that monitors, for diagnosis, operating states of the ECUs through the communications network. When the master ECU detects a given ECU that is in an abnormal state, it restarts, through the communications network, the given ECU to return to an initial state. When the master ECU initializes the given ECU, it stores a record of initializing the given ECU in its EEPROM, and initializes, when necessary, a built-in memory of the given ECU. The master ECU can be constructed as initializing the given ECU based on an initialization request command from an outside of the vehicle through wireless communications.

16 Claims, 4 Drawing Sheets

VEHICULAR COMMUNICATIONS SYSTEM INITIALIZING ABNORMAL CONTROL UNIT

CROSS REFERENCE TO RELATED APPLICATIONS

This application is based on and incorporates herein by reference Japanese Patent Application No. 2002-171510 filed on Jun. 12, 2002.

FIELD OF THE INVENTION

The present invention relates to a vehicular communications system including an initializing unit for suitably initializing an abnormal control unit alone out of controls units in the system.

BACKGROUND OF THE INVENTION

Control units used for controlling in-vehicle devices are increasing for enhancing functions in a vehicle, in particular in an automobile. The control units are thereby required for coordinating with each other or sharing their data with each other.

The control units are therefore connected mutually through a communications line by respectively assembling circuits for data communications, and constitute a network, so called an in-vehicle local area network (in-vehicle LAN).

In this vehicular communications system using the network, if a certain control unit fails in functions, not only the certain control unit cannot operate a related device, but also other control units that exchange data with the certain control unit may not properly operate related devices.

This problem can be sometimes resolved by restarting the failing control unit. However, when the abnormal failing control unit is restarted, an in-vehicle battery is typically electrically opened, namely is detached from the vehicle. In this case, other normal control units are also initialized, so that recorded data that the normal control units store in a random access memory (RAM) may disappear simultaneously. This involves a long time in restoring the system to a normal state.

SUMMARY OF THE INVENTION

It is an object of the present invention to a vehicular communications system that initializes an abnormal failing control unit alone by restart without affecting other control units.

To achieve the above object, a communications system having a communications network is provided with the following. In-vehicle control units for respective in-vehicle devices are disposed to be connected mutually through the communications network. An initializing unit is disposed for monitoring operating states of the control units through the communications network, and sending, when the initializing unit detects a given control unit in an abnormal operating state, a restart command to the given control unit. The given control unit restarts itself to return to an initial state with the restart command from the initializing unit. This structure enables the abnormal control unit alone to be initialized by the initializing unit while the other control units are not affected. This results in that the system is rapidly restored to a normal state.

In another aspect of the present invention, a communication system is further provided with a wireless communications unit that enables data communicates among the initializing unit and an external device outside a vehicle. Here, the initializing unit sends the restart command to the given control unit according to a request from the external device. This structure enables utilization of an outside party such as a service center for vehicles. This results in expediting identification of an abnormal control unit and thereby rapid restoration of the system.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
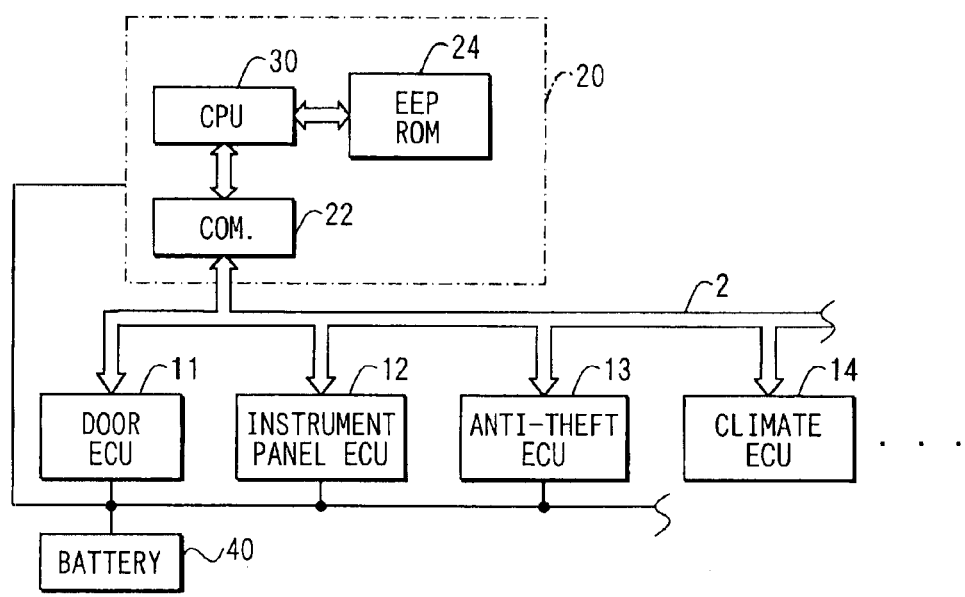
FIG. 1 is a schematic block diagram showing structure of a vehicular communications system according to a first embodiment of the present invention.

FIG. 1 shows a block diagram showing overall structure of a vehicular communications system according to a first embodiment of the present invention.

The vehicular communications system includes electronic control units (ECUs) relating to vehicle body control. The ECUs are as follows: a door ECU 11; an instrument panel ECU 12; an anti-theft ECU 13; a climate control ECU 14; and the like. These ECUs are connected mutually through a network (communications line 2) to constitute a body control local area network (body control LAN). In addition to the above ECUs 11 to 14, a master ECU 20 for diagnosing the system is also connected.

The master ECU 20 monitors the above ECUs 11 to 14 through the communications line 2 to detect an abnormal ECU 11 to 14. When the abnormal ECU 11 to 14 is detected, the master ECU 20 initializes the abnormal ECU 11 to 14 through the communications line 2.

The master ECU 20 includes: a communications unit 22 (COM. in FIG. 1) for executing data communications with the ECUs 11 to 14; a central processing unit (CPU) 30 for processing of monitoring and initializing the ECUs 11 to 14; and a non-volatile memory (electrically erasable and programmable read only memory (EEPROM) in this embodiment) 24 for storing operating states of the ECUs 11 to 14 and a record of the initialization when the CPU 30 detects the abnormal ECU 11 to 14 to initialize it.

The door ECU 11 is for locking/unlocking doors or opening/closing power windows according to a command of a user. The instrument panel ECU 12 is for displaying, on a display (not shown), various vehicular states such as traveling speed, engine revolution speed, door opening/closing state, or transmission shift. The anti-theft ECU 13 is for sounding an alarm or notifying an outside control center by detecting third person's illegal invasion while the vehicle is parked. The climate control ECU 14 is for controlling an in-vehicle air-conditioner to keep vehicle interior temperature proper.

Each of the ECUs 11 to 14 includes a communications unit and a CPU similarly with the master ECU 20. It further includes manipulating switches through which the user inputs various commands, sensor switches for detecting vehicular states, an actuator of a control object, and signal input/output interfaces connected with a display device or the like.

Except for the climate control ECU 14, the ECUs 11 to 13, 20 are operated with being directly supplied with electric power from an in-vehicle power source (battery) 40.

Figure 2A:
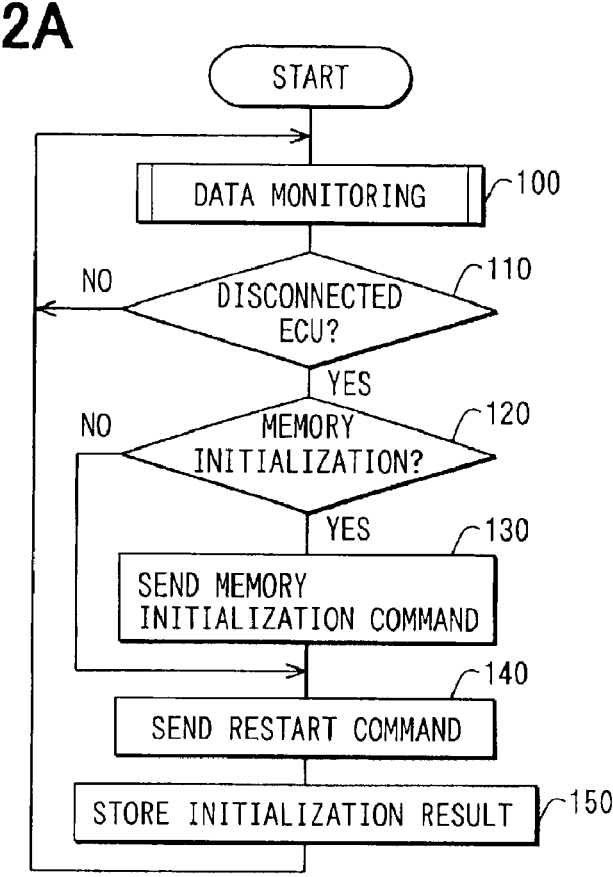
FIG. 2A is a flow diagram explaining monitoring processing of a master ECU according to the first embodiment.

Referring to FIG. 2A, operating-state monitoring processing by the master ECU 20 will be explained below. This processing is repeatedly executed by the CPU 30 of the master ECU 20.

At Step 100, communications-data monitoring processing is executed. Here, data flowing on the communications line 2 is read in through the communications unit 22, and a currently operating ECU 11 to 14 that is not sleeping is detected. It is monitored whether the currently operating ECU 11 to 14 is in a normal state by checking unsent interval of a piece of communications data that is periodically sent from the ECU 11 to 14.

Figure 3:
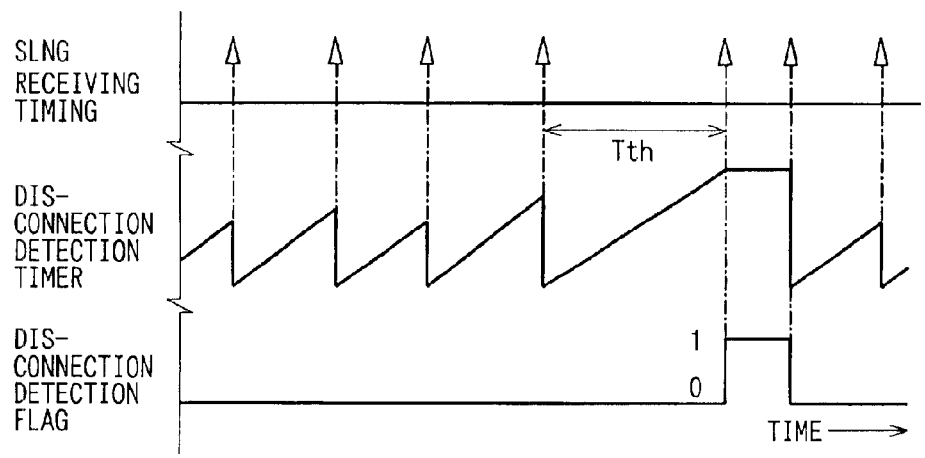
FIG. 3 is a time chart showing the monitoring processing of the master ECU according to the first embodiment.

In detail, the communications-data monitoring processing is executed as shown in FIG. 3. The ECUs 11 to 14 that are not sleeping periodically send a signal SLNG at an interval Tth. The CPU 30 of the ECU 20 checks the signal SLNG for each ECU 11 to 14 and resets a disconnection detection timer for each ECU 11 to 14 at receiving the signal SLNG. When the signal SLNG is not received within the interval Tth, a disconnection detection flag is thereby set to 1 from 0.

The interval Tth is set according to a protocol selected at constructing the network. In this embodiment, a protocol of Body Electronics Area Network (BEAN) is selected and each ECU 11 to 14 outputs the SLNG at an interval less than 10 seconds.

However, protocols for Controller Area Network (CAN) that is proposed by German Robert Bosch GmbH, FlexRay that is for high-speed control in-vehicle network standards, and the like can be selected instead of BEAN. The disconnection detection flag is reset to 0 when the corresponding ECU 11 to 14 sends a signal SLNG and the disconnection detection timer is thereby reset.

At Step 110, it is determined whether any ECU 11 to 14 is in a disconnected state, based on the disconnection detection flag in the communications-data monitoring processing. When any ECU 11 to 14 is determined to be not in the disconnected state, the processing returns to Step 100. When a certain ECU 11 to 14 is determined to be in the disconnected state, it is furthermore determined whether the disconnected ECU 11 to 14 is set to initialize a built-in memory such as a RAM within its CPU at its restart.

When the disconnected ECU 11 to 14 is not set to initialize the built-in memory, a memory-initialization command is sent to the disconnected ECU 11 to 14 through the communications unit 22 at Step 130. The processing then proceeds to Step 140. By contrast, when the disconnected ECU 11 to 14 is set to initialize the built-in memory, the processing directly proceeds to Step 140 instead.

Figure 2B:
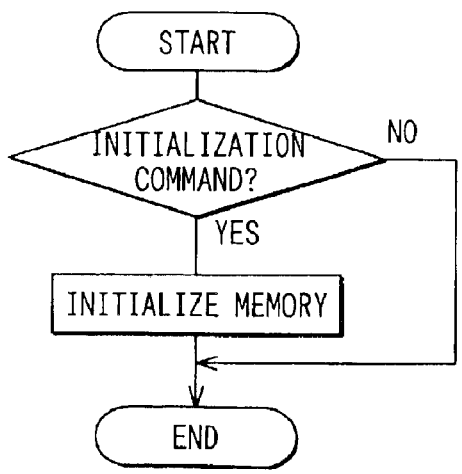
FIG. 2B is a flow diagram explaining memory-initialization processing of a monitored ECU according to the first embodiment.

When the memory-initialization command is received by the communications unit of the disconnected ECU 11 to 14, the disconnected ECU 11 to 14 starts memory-initialization processing to initialize the built-in memory as shown in FIG. 2B.

At Step 140, a restart command is sent to the disconnected ECU 11 to 14 through the communications unit 22. At Step 150, disconnection information is stored in the EEPROM 24, and the processing returns to Step 100. The disconnection information includes a name or identification number of the disconnected ECU 11 to 14, date and hour of the initialization, operating states of other ECUs 11 to 14, or the like.

Figure 2C:
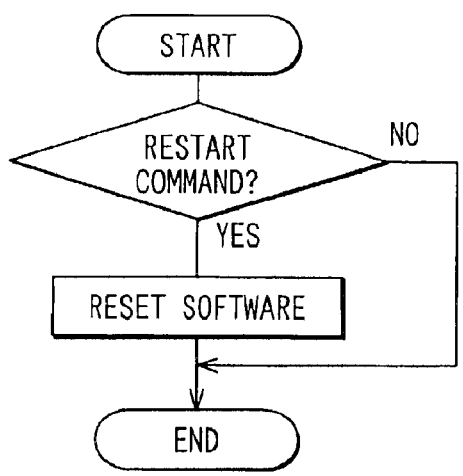
FIG. 2C is a flow diagram explaining restart processing of the monitored ECU according to the first embodiment.

When the restart command is received by the communications unit of the disconnected ECU 11 to 14, the disconnected ECU 11 to 14 starts restart processing for resetting its software to return to an initial state as shown in FIG. 2C.

As explained above, in the vehicular communications system, the master ECU 20 monitors other ECUs 11 to 14 based on communications data flowing on the network, to detect the ECU (disconnected ECU) 11 to 14 that is in the disconnected state. The master ECU 20 thereby sends, to the disconnected ECU 11 to 14, the restart command to control the disconnected ECU 11 to 14 for restarting itself.

This structure enables the disconnected ECU 11 to 14 alone to be initialized by the master ECU 20. The other ECUs are therefore not affected, so that the communications system is rapidly restored to a normal state.

For instance, even when the instrument panel ECU 12 fails in displaying vehicle speed during the traveling of a vehicle, the master ECU 20 that monitors an operating state of the instrument panel ECU 12 to initialize it for properly displaying without stopping the vehicle traveling. This results in enhancing safety during the vehicle traveling.

In this communications system, the master ECU 20 detects the disconnected ECU 11 to 14 and then stores the disconnection information in the EEPROM 24 along with sending the restart command to the disconnected ECU 11 to 14. Reasons of the failure are thereby studied from the stored disconnection information for preventing reoccurrence of failure in the ECUs 11 to 14.

Furthermore, the ECUs whose built-in memories should be initialized at the restart are previously set. The master ECU 20 sends, to the relevant ECU 11 to 14, the memory-initialization command along with the restart command, so that the built-in memory of the relevant ECU 11 to 14 is initialized. The relevant ECU 11 to 14 is thereby prevented from failing again posterior to the restart, due to undeleted data that still remain in the built-in memory.

Second Embodiment

Figure 4:
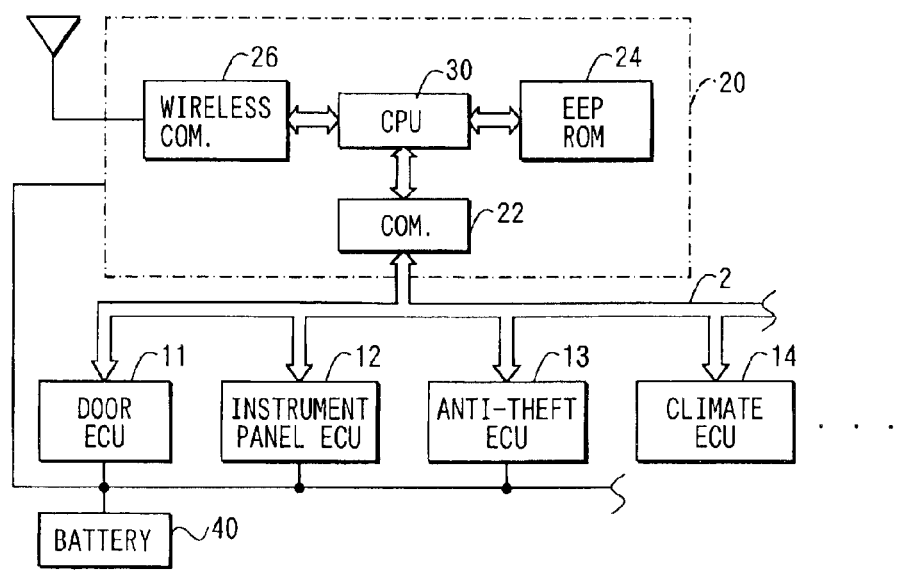
FIG. 4 is a schematic block diagram showing structure of vehicle communications system according to a second embodiment of the present invention.

FIG. 4 shows a block diagram showing overall structure of a communications system according to a second embodiment of the present invention.

As shown in FIG. 4, the structure of the second embodiment is similar to that of the first embodiment except that the master ECU 20 has a wireless communications unit 26 (WIRELESS COM. in FIG. 4). The wireless communications unit 26 is for executing wireless communications, through wireless phone lines or dedicated wireless lines with an outside device, e.g., a communications device located in a service center for vehicles.

In the second embodiment, the master ECU 20 initializes a certain ECU 11 to 14 based on an initialization request command from the outside device, instead of detection, by the master ECU 20 itself, of the failure in the ECUs.

Figure 5:
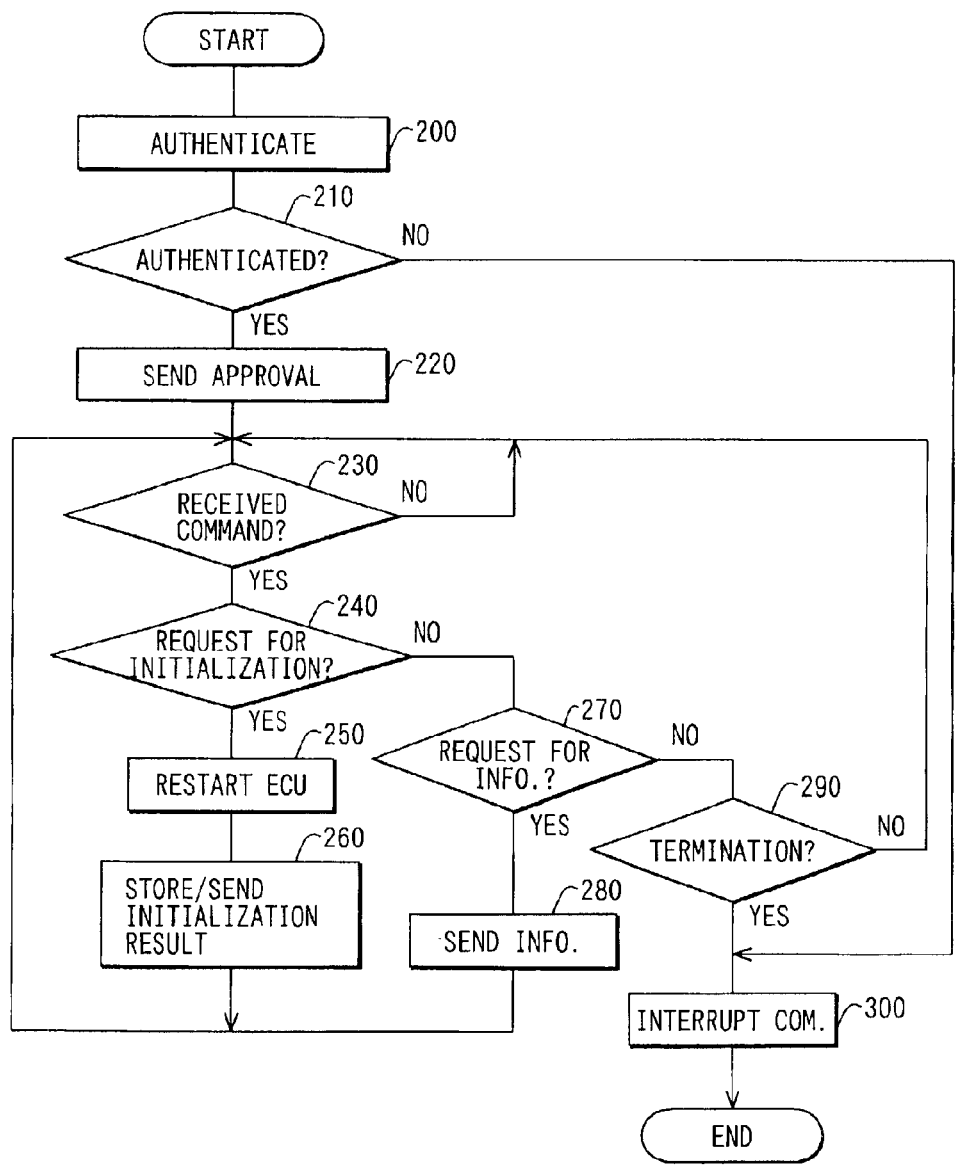
FIG. 5 is a flow diagram explaining outside-communications processing of a master ECU according to the second embodiment.

Referring to FIG. 5, outside-communications processing for communications with an outside of a vehicle will be explained below. This processing is started by the CPU 30 of the master ECU 20 when the CPU 30 receives a signal from the outside device through the wireless communications unit 26. Incidentally, in addition to the outside-communications processing, the CPU 30 usually executes monitoring processing (not shown) for monitoring operating states of other ECUs 11 to 14 that are connected with the communications line 2.

At Step 200, the CPU 30 executes processing for authentication whether the outside device is an acceptable device for communicating with the master ECU 20 based on an authentication code included in a received signal. At Step 210, it is determined whether the outside device is successfully authenticated. When the outside device is determined to be not authenticated, the processing is terminated.

When the outside device is determined to be successfully authenticated, the processing proceeds to Step 220, where an approval for communications is sent to the outside device through the wireless communications unit 26.

When a command from the outside device is received through the wireless communications unit 26, it is determined whether the command is an initialization request command for requesting initialization of a certain ECU 11 to 14 at Step 240. When the initialization request command is received, a restart command is sent to the corresponding ECU 11 to 14 through the communications unit 22 at Step 250.

When the received initialization request command includes a memory-initialization request command along with a restart request command, a memory-initialization command is also sent to the corresponding ECU 11 to 14 at Step 250, similarly with the processings at Steps 130, 140 of the first embodiment. Namely, the outside device can select either initialization of the ECU 11 to 14 itself or the built-in memory of the ECU 11 to 14 along with the ECU 11 to 14 itself.

At Step 260, result of the initialization is sent to the outside device through the wireless communications unit 26 along with being stored in the EEPROM 24 similarly with the processing at Step 150 of the first embodiment. The processing then returns to Step 230.

At Step 240, when the received command is determined to be not the initialization request command, the processing proceeds to Step 270. Here, it is determined whether the received command is a vehicle-information (INFO.) request command for requesting vehicle information. When the received command is the vehicle-information request command, the processing proceeds to Step 280. Here, the CPU 30 sends vehicle information through the wireless communications unit 26 to the outside device, and the processing returns to Step 230. The vehicle information includes operating states of the ECUs 11 to 14 that are obtained as result of-the monitoring processing that is separately executed by the CPU 30.

At Step 270, when the received command is determined to be not the vehicle-information request command, the processing proceeds to Step 290. Here, it is determined whether the received command is a communications-termination request command for requesting termination of the communications. When the received command is determined to be not the communications-termination request command, the processing returns to Step 230. Otherwise, the processing proceeds to Step 300, where the communications with the outside device is interrupted and the processing is terminated.

As explained above, in the embodiment, the master ECU 20 receives the command sent from the outside device through the wireless communications, and it is determined whether the received command is the initialization request command. When the received command is determined to be the initialization request command, the master ECU 20 makes the corresponding ECU 11 to 14 or the built-in memory of the corresponding ECU 11 to 14 initialize, and then sends the result of the initialization along with storing it in the EEPROM 24. Similarly with the first embodiment, a certain abnormal ECU 11 to 14 alone on the network can be initialized by the master ECU 20. The outside device can then confirm result of the initialization processing.

Furthermore, this embodiment is supposed to be directed to the following case. When any failure or abnormality is found in a vehicle, a user such as a driver of the vehicle notifies, through phone or the like, the vehicle state to an outside party such as a service center. A service person who receives the notification of the vehicle state identifies an ECU 11 to 14 that fails, and remotely initializes the ECU 11 to 14. In this embodiment, the master ECU 20 is constructed to monitor operating states of ECUs 11 to 14 and send monitoring results to the outside device according to the request of the outside device. When the service person received the above notification of the vehicle state, he obtains vehicle information including operating states of the ECUs 11 to 14 from the master ECU 20 and identifies the ECU 11 to 14 that fails, so as to initialize it.

(Modification)

This invention is not only directed to the above embodiments, but also to other embodiments.

For instance, in the above embodiments, the invention is directed to the body control LAN including the door ECU 11, the instrument panel ECU 12, and the like, out of in-vehicle LANs. The invention can be directed to the following: a traveling/braking related network including an engine ECU, a transmission ECU, a brake ECU, and the like; an audio/visual related network including a navigation ECU, an audio ECU, and the like; and a network that combines the above networks with a gateway ECU. In the network that combines the various networks with the gateway ECU, an initialization function of the master ECU 20 can be installed in the gateway ECU.

It will be obvious to those skilled in the art that various changes may be made in the above-described embodiments of the present invention. However, the scope of the present invention should be determined by the following claims.

What is claimed is:

1. A communications system comprising:

a communications network;

a plurality of control units that are provided inside a vehicle, control respective in-vehicle devices, and exchange data with each other through the communications network; and an initializing unit that monitors operating states of the control units through the communications network, and sends, when the initializing unit detects a given control unit which is in an abnormal operating state, a restart command to the given control unit through the communications network, wherein the given control unit restarts itself to return to an initial state when the given control unit receives the restart command from the initializing unit.

2. A communications system comprising:

a communications network;

a wireless communications unit that executes wireless communicates with an external device outside the vehicle;

a plurality of control units that are provided inside a vehicle, control respective in-vehicle devices, and exchange data with each other through the communications network; and an initializing unit that receives, from the external device, an initialization command for initialing a given control unit of the control units, and thereby sends, to the given control unit through the communications network, a restart command, wherein the given control unit restarts itself to return to an initial state when it receives the restart command from the initializing unit.

3. A communications system according to claim 2, the initializing unit monitors operating states of the control units through the communications network, and sends, to the external device through the wireless communications unit, a result obtained from monitoring the operating states of the control units when a sending command for requesting information of the vehicle is received from the external device.

4. A communications system according to claim 1 or 2, wherein the initializing unit stores a result of sending the restart command in a nonvolatile memory.

5. A communications system according to claim 1 or 2, wherein the given control unit initializes a built-in memory along with restarting itself to return to the initial state when it receives the restart command from the initializing unit.

6. A communications system according to claim 1 or 2, wherein the initializing unit sends a memory-initialization command to the given control unit when it sends the restart command to the given control unit through the communications network, and wherein the given control unit initializes a built-in memory when the given control unit receives the memory-initialization command from the initializing unit.

7. A communications system according to claim 1 or 2, wherein the given control unit, which restarts itself to return to the initial state according to the restart command from the initializing unit, is directly supplied with constant electric power by an in-vehicle battery so that the given control unit works irrespective of operating states of the vehicle.

8. An initializing unit provided in a communications system that includes: a communications network; and a plurality of control units that are inside a vehicle, control respective in-vehicle devices, and exchange data with each other through the communications network, the initializing unit comprising:

communications means for exchanging data through the communications network;

monitoring means for monitoring operating states of the control units through the communications network; and restart commanding means for sending, when a given control unit of the control units is detected to be in an abnormal operating state by the monitoring means, a restart command for restarting the given control unit to return to an initial state, to the communications network through the communications means.

9. An initializing unit provided in a communications system that includes: a communications network; and a plurality of control units that are inside a vehicle, control respective in-vehicle devices, and exchange data with each other through the communications network, the initializing unit comprising:

communications means for exchanging data through the communications network;

wireless communications means for executing wireless communications with an external device outside the vehicle; and restart commanding means for sending, when an initialization command for initialing a given control unit of the control units is received from the external device through the wireless communications means, to the communications network through the communications means, a restart command for restarting the given control unit to return to an initial state.

10. An initializing unit according to claim 9, further comprising:

monitoring means for monitoring operating states of the control units through the communications network; and sending means for sending, to the external device through the wireless communications means, a result obtained from monitoring the operating states of the control units by the monitoring means when a sending command for requesting information of the vehicle is received from the external device.

11. An initializing unit according to claim 8 or 9, further comprising:

a nonvolatile memory for storing a result of sending the restart command, wherein the restart commanding means stores the result of sending the restart command in the nonvolatile memory when the restart commanding means sends the restart command to the communications network through the communications means.

12. An initializing unit according to claim 8 or 9, wherein the restart commanding means sends a memory-initialization command in addition to the restart command when the restart commanding means sends the restart command to the communications network through the communications means, and wherein the memory-initialization command is for initializing a built-in memory of the given control unit.

13. An in-vehicle control unit that is disposed in a vehicle and provided in a communications system having a communications network and an initializing unit connected with the communications network, the in-vehicle control unit comprising:

communications means for receiving data from the initializing unit through the communications network; and restart means for restarting itself to return to an initial state when a restart command from the initializing unit is received by the communications means.

14. An in-vehicle control unit according to claim 13, further comprising:

a built-in memory; and memory initializing means for initializing the built-in memory when the restart command is received by the communications means.

15. An in-vehicle control unit according to claim 13, further comprising:

a built-in memory; and memory initializing means for initializing the built-in memory when a memory-initialization command from the initializing unit is received by the communications means.

16. An in-vehicle control unit according to claim 13, further comprising:

power obtaining means for directly obtaining constant electric power from an in-vehicle battery irrespective of operating states of the vehicle.

* * * * *